United States Patent [19]

Rothermel et al.

[11] Patent Number: 5,367,338

[45] Date of Patent: Nov. 22, 1994

[54] METHOD AND APPARATUS FOR CONVERTING THE SAMPLING RATES OF A DIGITAL VIDEO SIGNAL

[75] Inventors: Albrecht Rothermel, Villingen; Rainer Schweer, Niedereschach; John Stolte, Tannheim, all of Germany; David Gillies, Strasbourg, France

[73] Assignee: Deutsche Thomson-Brandt GmbH, Villingen-Schwenningen, Germany

[21] Appl. No.: 14,579

[22] Filed: Feb. 8, 1993

[30] Foreign Application Priority Data

Feb. 7, 1992 [DE] Germany ............................. 4203478

[51] Int. Cl.$^5$ ........................ H04N 7/01; H04N 7/04; H04N 5/04
[52] U.S. Cl. ................................... 348/538; 348/523; 348/536
[58] Field of Search ................... 358/140, 141, 11, 12, 358/19, 28, 17, 148, 149; H04N 7/01, 7/04, 17/02, 11/20, 5/04; 348/500, 536, 537, 538, 523, 572

[56] References Cited

U.S. PATENT DOCUMENTS

| | | | |
|---|---|---|---|
| 4,438,452 | 3/1984 | Powers | 358/13 |
| 4,455,611 | 6/1984 | Powers | 364/760 |
| 4,550,335 | 10/1985 | Powers | 358/11 |
| 4,568,965 | 2/1986 | Powers | 358/140 |
| 4,612,573 | 9/1986 | Grallert et al. | 358/140 |
| 4,792,856 | 12/1988 | Shiratsuchi | 358/180 |
| 5,068,716 | 11/1991 | Takayama et al. | 358/12 |
| 5,121,207 | 6/1992 | Herrmann | 358/160 |

FOREIGN PATENT DOCUMENTS

| | | | |
|---|---|---|---|
| 0152738 | 8/1985 | European Pat. Off. | H04N 7/01 |
| 393812 | 10/1990 | European Pat. Off. | H04N 9/64 |
| 3249578 | 11/1982 | Germany | G06F 5/00 |
| 3333225 | 3/1985 | Germany | H04N 7/12 |
| 3935453 | 5/1991 | Germany | H04N 5/14 |
| 63985 | 4/1982 | Japan | H04N 9/491 |
| 51387 | 3/1985 | Japan | H04N 9/67 |

*Primary Examiner*—James J. Groody
*Assistant Examiner*—Glenton B. Burgess
*Attorney, Agent, or Firm*—Joseph S. Tripoli; Peter M. Emanuel

[57] ABSTRACT

When processing a digital video signal, the problem often arises of converting the signal from a first sampling raster which is asynchronous with respect to the line interval to a second sampling raster which synchronous with the line interval. Interpolation filters are used for this purpose. The present invention provide a simple method for the conversion which does not require intermediate D/A or A/D conversion. For each line of the input signal, the phase of samples of the first sampling raster relative to the line synchronization pulse and the total number of the samples for this line are determined and are used to control of the interpolation filter.

4 Claims, 2 Drawing Sheets

METHOD AND APPARATUS FOR CONVERTING THE SAMPLING RATES OF A DIGITAL VIDEO SIGNAL

FIELD OF THE INVENTION

The invention concerns converting a digital video signal having a first sampling rate to a digital video signal having a second sampling rate.

BACKGROUND OF THE INVENTION

In a digital video signal processing system, it is often useful to use different clock frequencies in different parts of the system. For example, a clock signal linked to the phase of the color carrier is often used for deeming color signals encoded in accordance with PAL, SECAM or NTSC standard to obtain color information. On the other hand, for various types of digital signal processing which combine picture elements from various video lines (two dimensional) or from various frames (three dimensional), a clock signal which has a fixed phase relationship to the line synchronization signal is advantageous (so-called orthogonal raster). Consequently, it is often necessary to convert a digital video signal having a first scanning or sampling raster into a digital video signal having a second, different scanning raster. This is possible by converting the first digital video signal having the first sampling raster into an analog video signal by means of a digital to analog (D/A) converter, and then resampling the analog signal with the second sampling raster by means of an analog to digital (A/D) converter in order to obtain the second digital video signal having the second sampling raster. However, the necessary D/A conversion and A/D conversion thereby entailed, requires additional circuitry and results in unavoidable losses and faults.

SUMMARY OF THE INVENTION

This invention is directed to providing a simple technique for the conversion of an input digital video signal having a first sampling raster not synchronous with the line synchronization signal into an output digital signal having a second sampling raster synchronous with the line synchronization signal which works purely digitally and does not require D/A conversion and A/D conversion.

Specifically, in accordance with the invention, the phase of a sample of the input digital video signal at the beginning of the line, e.g. the first scanning value of the line, relative to the line synchronization pulse is preferably determined. Further, the phase of a sample at the end of the line, preferably the last sample of the line, relative to the line synchronization pulse may be determined. In addition, the total number of the samples per line of the digital signal is determined. With one or both of the phase values and the total number of samples per line, the time positions of all the samples of the input digital video signal within the line is then defined. The time positions of the second samples of the output digital video signal into which the input digital video signal is to be converted, are known because the second sampling raster is linked to the line synchronization signal and has a defined constant phase relative to the line synchronization pulse This means that the time positions of all the samples of the input digital video signal and the time positions of all the samples values of the output digital video signal are now known. This gives rise to the possibility of converting the scanning values in the digital domain without the need for a D/A conversion followed by a A/D conversion.

The conversion takes place, in particular, by means of a digital interpolation. For example, each sample of the output digital video signal may be determined by means of a linear interpolation, in which each sample value of the output digital signal is obtained by interpolation utilizing weighted versions of the temporally preceding and the temporally succeeding samples of the input digital video signal. However, it may be better, if, for the calculation of a sample value of the output video signal, a plurality of samples of the input digital video signal which are temporally adjacent be used, e.g., in accordance with an interpolation algorithm in which weighted multipliers corresponding to the temporal separation from the wanted sample of the digital output video signal be used.

A feature of the invention is that the first sampling clock signal of the input signal may be of any type and may be, e.g., linked to the color carrier signal, produced by a free running oscillator, or even subjected to time faults. In addition, the phase relationship between the first sampling raster of the input signal and the second sampling raster of the output signal may alter from scanning value to scanning value in dependence on the relationship of the sampling clock signals of the two sampling rasters. This deviation is taken into account and does not lead to faults in accordance with the invention, because for each line of the input signal, at least one of the beginning phase and the ending phase of the first sampling raster are known the number of scanning values during the line are evaluated.

These and other aspects of the invention will be explained with the help of the accompanying Drawing.

DETAILED DESCRIPTION OF THE EMBODIMENT OF THE INVENTION

Figure 1:
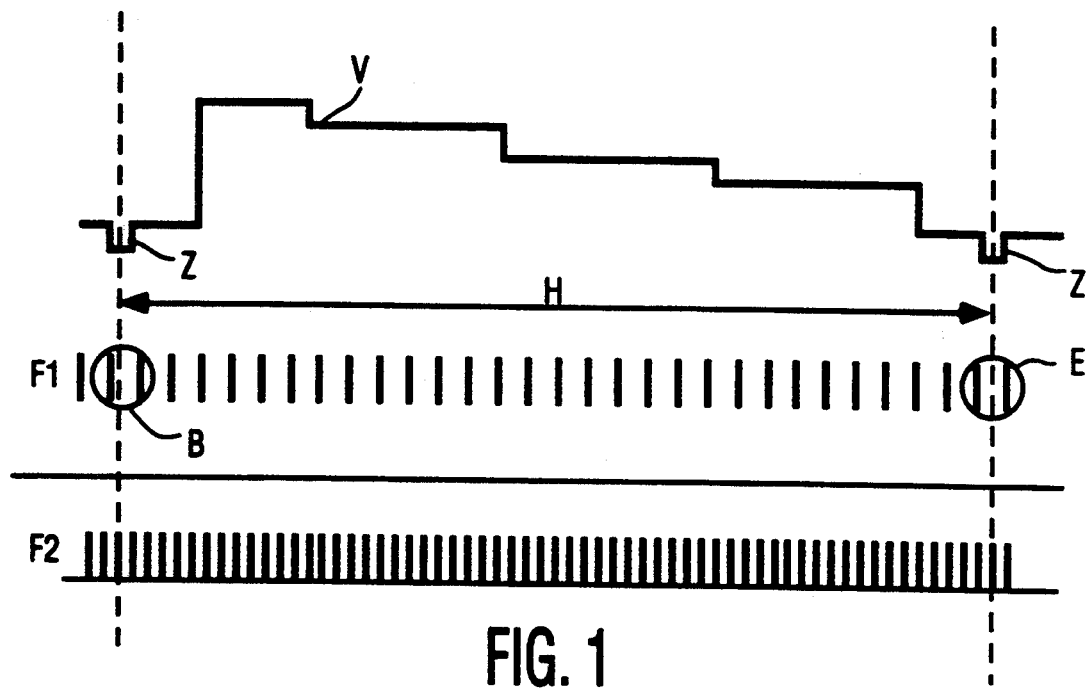
FIG. 1 shows the sampling raster of a digital video input signal and the sampling raster of a digital video output signal during one line.

FIG. 1 shows the analogue video signal V-during one horizontal line period H between two line synchronization pulses Z. This input signal V is digitized by an analog to digital converter (A/D converter 1 shown in FIG. 2) in response to a first sampling clock signal having a first sampling raster F1 to produce the input digital video signal. Sampling raster F1 is not linked to the line synchronization signal and accordingly has a indeterminate phase and frequency relative to the line synchronization signal. The scanning raster F1 may be linked, for example, to the color carrier or be generated by a free-running oscillator. The video signal V may, for example, be a luminance signal Y or a color difference signal such as U or V.

For the signal conversion, sampling raster F1 is evaluated. First, the phase of the first sampling signal F1 relative to the line synchronization signal at the beginning of the line is measured by a phase detector by measuring the time difference between the first sampling pulse and the line synchronization pulse Z as is indicated by circle B. The phase of the first sampling signal F1 relative to the line synchronization signal at the end of the line may also be measured by the phase detector by measuring the time difference between the last sampling pulse and the line synchronization pulse Z at the end of the line as is indicated by circle E. Basically, the measurement of the phase of sampling raster as is indicated by B or E in FIG. 1 is only required once for each line since this value, together with the number of pulses in the raster, is sufficient to unambiguously define the raster. However, the phase measurement for each line is used twice, once to mark the end of one line and once to mark the beginning of the next line After that, the total number of samples of sampling signal F1 which occur within horizontal line H are counted. By means of these measured values, the sampling raster F1 is defined unambiguously in frequency and phase relative to the line H.

Sampling raster F2 of the output digital video signal into which the input signal is to be converted, is locked to the line scanning signal and therefore has a defined frequency and phase relative to the line H. That is, sampling signal F2 has a frequency which is an integral multiple of the line scanning frequency and has a constant phase angle relative to the line synchronization pulse Z, as is illustrated in FIG. 1. This means that all the samples of both sample pulses of sampling raster F1 and sampling raster F2, now have a known time position relative to line synchronization pulses Z.

It is now possible to convert each sample value of the digital input video signal having sampling raster F1 into a corresponding sample value of the output video signal having sample raster F2. This conversion takes place by means of a digital interpolation performed by an interpolator (IP 40 shown in FIG. 2). For example, a sample for the output signal is calculated by linearly interpolation by adding the temporally preceding sample of the input signal weighted according to its time position from the wanted sample of the output signal with the temporally succeeding sample of the input video signal weighted according to its time position from the wanted sample of the output signal.

Figure 2:
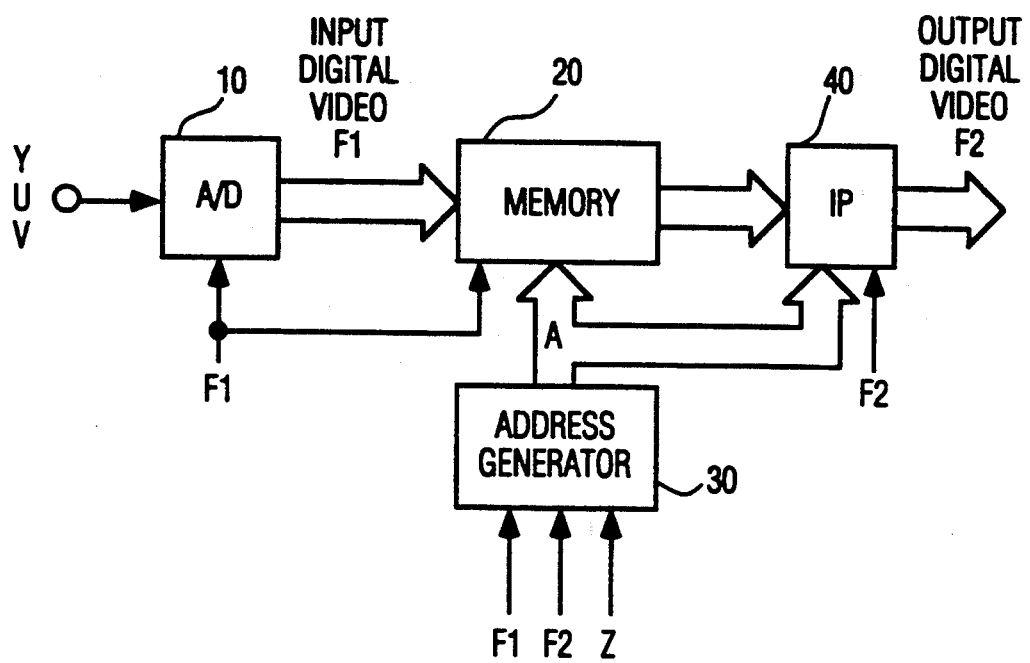
FIG. 2 shows a block diagram of an arrangement for carrying out the conversion method in accordance with the invention.

FIG. 2 shows a block diagram for the overall system described in functional steps with respect to FIG. 1. In the arrangement shown in FIG. 2, an input analog video signal, e.g., Y, U or V, is supplied to the A/D converter 1. A sampling clock signal having sampling raster F1 is also supplied to A/D converter 10. A/D converter 10 produces an input digital video signal having sampling raster F1. The digital samples of the input digital video signal are stored in sequential memory locations of a digital memory 20 in response to sample clock pulses of sampling signal F1. The samples stored in memory 20 are read out from respective memory locations in response to a digital address word A generated by a an address generator 30. Address word A is produced in accordance with the frequency ratio of sample rasters F1 and F2, and in accordance with the phase relationship between sample raster rasters F1 and an the horizontal synchronization signal Z discussed with respect to FIG. 1. This aspect of the invention will be described in more detail with respect to FIGS. 3 and 4. The samples read out of memory 20 are weighted and combined in an interpolation filter IP 40 to produce an output digital video signal having sample raster F2.

Figure 3:
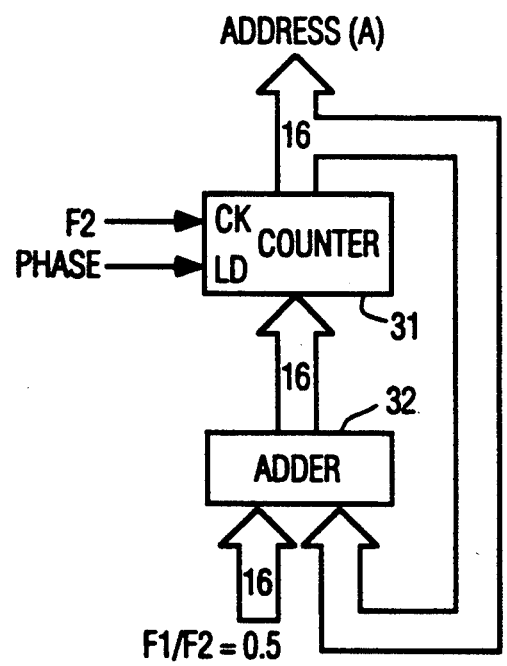
FIG. 3 shows a block diagram of a portion of the arrangement shown in FIG. 2.
Figure 4:
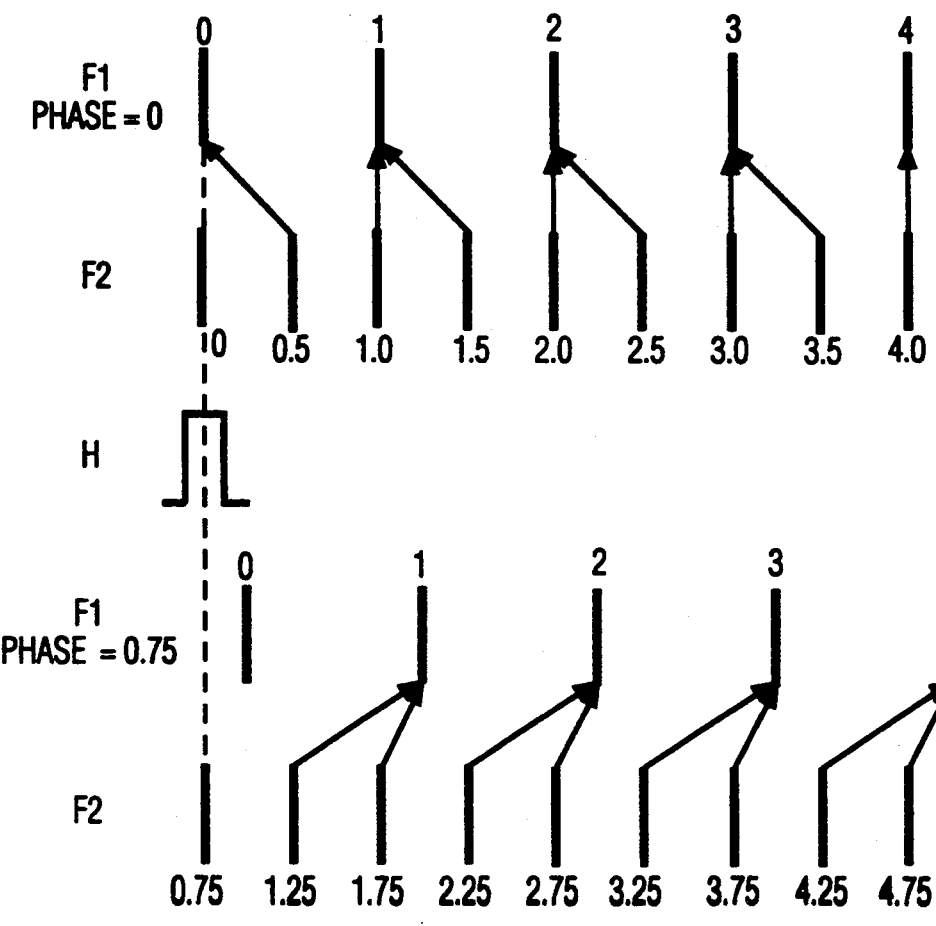
FIG. 4 shows graphical representations of input and output sampling rasters which are useful in understanding the operation of the arrangement shown in FIG. 3.

FIG. 3 shows a block diagram of address generator 30. Address generator 30 includes a counter 31 and an adder 32. By way of example, counter 31 and adder 32 are each capable of handling a 16 bit digital word. At the beginning of each horizontal line, a digital word corresponding to the phase difference between the sampling raster F1 and the horizontal synchronization signal Z, is loaded into the load (LD) input of counter 31, e.g., in response to a horizontal synchronization pulse Z. This digital phase word corresponds to a number which offsets the contents of the counter. The digital phase word is produced by a phase detector (not shown) in the manner discussed with respect to FIG. 1. The digital phase word represents a decimal number between 0, corresponding to a degree phase condition, and 1, corresponding to a 360 degree phase condition. FIG. 4 shows graphical representations of the operation of address generator 30 for two phase numbers, 0 and 0.75. Counter 31 is clocked at a clock input by pulses of sampling signal F2.

Adder 32 receives a digital word representing the contents of counter 31 at a first input, and a digital word representing the ratio of the frequencies of sampling rasters F1 and F2 (F1/F2) at a second input. A convenient way of obtaining the ratio F1/F2 is to obtain a ratio of the number of samples per line of the respective sampling rasters. The ratio F1/F2 is is added to the contents of counter 31 for each clock pulse of sampling raster F2. Adder 32 thus functions as an integrator and always adds the ratio F1/F2 to a number which is equal to the phase times the number of clock pulses of sample raster F2 which have occurred 0.5 since the beginning of the current line. The contents of counter 31 corresponds to the address (A) of the memory location of memory 20 which is read out for a respective clock pulse of sample raster F2, and also corresponds to the weight (multiplier) applied to the read out sample for purposes of interpolation, as will be explained below in detail. Counter 31 is stopped from counting when the total number of samples of sampling raster F2 for a respective line is reached.

By way of example, it will assumed that sampling raster F2 has twice the frequency of sample raster F1, so that F1/F2 equals 0.5. Thus, the number A increases by 0.5 for each clock pulse of sampling raster F2 as is indicated in FIG. 4. The first portion to the left the decimal point is a pointer for the memory location which contains a sample of sampling raster F1 from which the the corresponding is to be interpolated. The second portion of the number A indicates the relative phase or time position of the sample of sampling raster F2 with respect to the corresponding sample of sampling raster F1, and indicates the weight (or multiplier) which is to be applied to the sample of sampling raster read out from the addressed memory location. Thus, for example, with respect to the 0.75 phase condition, when A equals 2.25, memory location "2" is addressed and a weight of 0.25 is applied to the read out sample of sampling raster F1. While, the number A only corresponds to one of the two addresses and respective weight for the two samples of sampling raster F1 needed for a linear interpolation, the other address and respective weight can be easily obtained from a previous or succeeding A number. Thus, again with respect to the 0.75 phase condition, if the current A number is equal to 2.25, one sample of sampling raster F1 is read out from memory location "2" and multiplied by a weight of 0.25, and the other sample of sampling raster F1 obtained form the previous A number, 1.75, and is read out from memory location "1" and multiplied by 0.75.

The arrangement described with respect to FIGS. 2 and 3 is particularly suitable for construction utilizing monolithic integrated circuits. The following commercially available components may be used:

| memory 20: | μPD 41101-2 |
|---|---|
| interpolation filter 40: | ZR 33891 |
| address generator 30: | 74283 (four units) |
| | 74273 (two units) |

The first or last sample of sampling raster F1 does not necessarily have to be used to determine of the phase angle of sampling raster F1 relative to the line H, . In general, it may be a sample in the vicinity of the beginning of the line, e.g., the second or third sample and, respectively, a sample in the vicinity of the end of the line, e.g., the second or third samples from the end of the line.

In the described embodiment, a interpolation to obtain a sample of sampling raster F2 utilizing the temporally preceding and the temporally succeeding samples of sampling raster F1 is used. In practice, an interpolation utilizing more samples, e.g., six to eight, may be more desirable. These and other modifications are intended to be within the scope of the invention defined by the following claims.

We claim:

1. A method for converting an input digital video signal having a first sampling raster which has an asynchronous phase relationship with a video line to an output digital signal having a second sampling raster which has a synchronous phase relationship with said video line, by use of an interpolator, comprising the steps of:

measuring, for each line of the input digital video signal, the phase of a sample pulse relative to the line synchronization pulse;

determining, for each line of the input digital video signal, the total number of the samples which occur during the line interval of the line; and controlling said interpolator in accordance with said phase and said total number of samples.

2. The method in accordance with claim 1, wherein:
   said phase of the sample pulse relative to the line synchronization pulse is measured at least one of the beginning and the end of the line.

3. The method in accordance with claim 2, wherein:
   said phase is measured using at at least one of the first and last sample of the line of said input digital signal.

4. Apparatus for converting an input digital video signal having a first sampling raster which has an asynchronous phase relation with a video line to an output digital signal having a second sampling raster which has a synchronous phase relationship with a video line, comprising:

a memory for storing samples of said input digital video signal;

means for measuring, for each line of the input digital video signal, the phase of a sample relative to a line synchronization pulse;

a counter;

means for offsetting the contents of the counter by a number corresponding to said phase;

means for adding to the contents of the counter a number corresponding to the ratio of the frequencies of the first and second sampling rasters for each sample of said second raster which occur during a video line;

means for addressing memory locations of said memory in accordance to the contents of said counter; and means for weighting samples stored in addressed memory locations of said memory in accordance with the contents of said counter.

* * * * *